United States Patent

Kobayashi et al.

Patent Number: 5,934,157
Date of Patent: Aug. 10, 1999

[54] FLEXIBLE MESHING TYPE GEAR DEVICE HAVING A HIGH WEAR-RESISTING RIGID INTERNAL GEAR

[75] Inventors: Masaru Kobayashi; Yoshihide Kiyosawa, both of Nagano-ken, Japan

[73] Assignee: Harmonic Drive Systems, Inc., Tokyo, Japan

[21] Appl. No.: 08/970,498

[22] Filed: Nov. 14, 1997

[51] Int. Cl.⁶ .......... F16H 33/00; F16H 55/06; F16H 55/17; B05D 1/18

[52] U.S. Cl. .......... 74/640; 74/464; 74/460; 427/438

[58] Field of Search .......... 74/395, 640, 460, 74/464; 428/667, 679; 427/438; 384/625, 300, 912, 913

[56] References Cited

U.S. PATENT DOCUMENTS 5,203,224 4/1993 Honda .......... 74/464 X
5,269,202 12/1993 Kiyosawa et al. .......... 74/640
5,364,250 11/1994 Aoki et al. .......... 418/201.1

Primary Examiner—John A. Jeffery
Assistant Examiner—Brandon C. Stallman
Attorney, Agent, or Firm—Burns, Doane, Swecker & Mathis LLP

[57] ABSTRACT

A flexible meshing type gear device 1 has an internal gear 2 having internal teeth 21, a flexible external gear 3 having external teeth 31, and a wave generator 4. Only the internal teeth 21 of the internal gear 2 are formed thereon with a metal plated coating 21a. Further, a tooth profile 211 of the internal teeth 21 of the rigid internal gear 2 before metal plating is modified from a desired tooth profile of the internal teeth so that a tooth profile 212 defined by a surface of the internal teeth 21 after metal plating corresponds substantially to the desired tooth profile of the internal teeth for assuring a proper meshing between the internal and external gears. Accordingly, a flexible meshing type gear device having a high wear resistance can be realized while maintaining a high fatigue strength of the external gear and a proper meshing between gears.

12 Claims, 2 Drawing Sheets

FLEXIBLE MESHING TYPE GEAR DEVICE HAVING A HIGH WEAR-RESISTING RIGID INTERNAL GEAR

BACKGROUND OF THE INVENTION

1. Field of the Invention

The present invention relates to a flexible meshing type gear device and in particular to a flexible meshing type gear device which has a rigid internal gear of high wear resistance.

2. Prior Art Description

A typical flexible meshing type gear device comprises a circular rigid internal gear, a flexible external gear arranged inside the circular rigid internal gear, and a wave generator for deforming the flexible external gear into, for example, an ellipsoid to mesh it with the rigid internal gear partially. The wave generator is driven by a motor to move the meshing portions between the gears circumferentially, whereby relative rotation therebetween is occurred in accordance with the difference in tooth number between the gears.

The circular rigid internal gear is normally fixed to a housing of the device wherein relative rotation is output from the flexible external gear. Typically, the difference in tooth number between the gears is 2n (n: positive integer), and, for example, the tooth number of the flexible external gear is two fewer than that of the circular rigid internal gear. In this case, the reduction ratio of the flexible meshing type gear device is expressed by the following equation.

$$i = 1/R = (Zf - Zc)/Zf = -2/Zf$$

where Zc: tooth number of the circular rigid internal gear, and

Zf: tooth number of the flexible external gear.

Provided that Zc=202 and Zf=200, the reduction ration i becomes −1/100 in which symbol '−' means that the rotational direction of the output is opposite against that of the rotational input, while symbol '+' means that the output rotational direction is the same as the input rotational one.

In a flexible meshing type gear device, the respective external teeth of the flexible external gear are repeatedly deformed in the radial direction to mesh with the internal teeth of the rigid internal gear intermittently. Thus, the teeth of both gears suffer from much more intensive wearing than those of general gear transmission mechanisms. In order to enhance wear resistance of a flexible meshing type gear device, it is necessary to provide the internal and external gears with a high wear resistance. However, a satisfactory surface treatment which can be applied to the internal and external gears has not been proposed to enhance the wear resistance of the internal and external gears without causing defects such as deterioration of dimensional accuracy of gears, the lowering of fatigue strength of the flexible external gear and the like.

SUMMARY OF THE INVENTION

An object of the present invention is to provide a flexible meshing type gear device which has a high wear-resisting properties.

Another object of the present invention is to provide a flexible meshing type gear device which has high wear-resisting internal and external gears without deteriorating dimensional accuracy of teeth of both gears.

Still another object of the present invention is to provide a flexible meshing type gear device which has high wear-resisting internal and external gears without degrading fatigue strength of the external gear.

In order to achieve the above and other objects and advantages, according to the present invention, there is provided a flexible meshing type gear device which comprises a circular rigid internal gear having internal teeth on an inner circumferential surface thereof, a flexible external gear having external teeth on an outer circumferential surface thereof, the external teeth being meshable with the internal teeth, and a wave generator for deforming the flexible external gear radially to partially mesh the external teeth thereof with the internal teeth of the rigid internal gear and for moving meshing portions of the teeth circumferentially, characterized in that only the internal teeth of the rigid internal gear are formed thereon with a metal plated coating.

As metal plating, electrolytic or electroless plating of Ni, Cr and the like can be adopted. Instead, PTFE dispersed metal plating can also be employed.

The thickness of the metal plated coating is preferably in the range from 2 micrometer to 20 micrometer. The coating hardness of the metal plated coating is preferably in the range from −100 Hv to +100 Hv (vickers hardness) with respect to the surface hardness of the external teeth of the flexible external gear, and more preferably between −50 Hv and +50 Hv.

In another aspect of the present invention, the tooth profile of the internal teeth of the rigid internal gear before metal plating is modified from a desired tooth profile of the internal teeth so that the tooth profile defined by the surface of the internal teeth after metal plating becomes to correspond to the desired tooth profile of the internal teeth. According to the present invention, since the internal teeth of the internal gear has a modified tooth profile in consideration of the thickness of the metal plated coating on the internal teeth, proper meshing between the internal and external gears can be maintained after the internal teeth of the internal gear is subject to metal plating.

DETAILED DESCRIPTION OF THE PREFERRED EMBODIMENT

Figure 1:
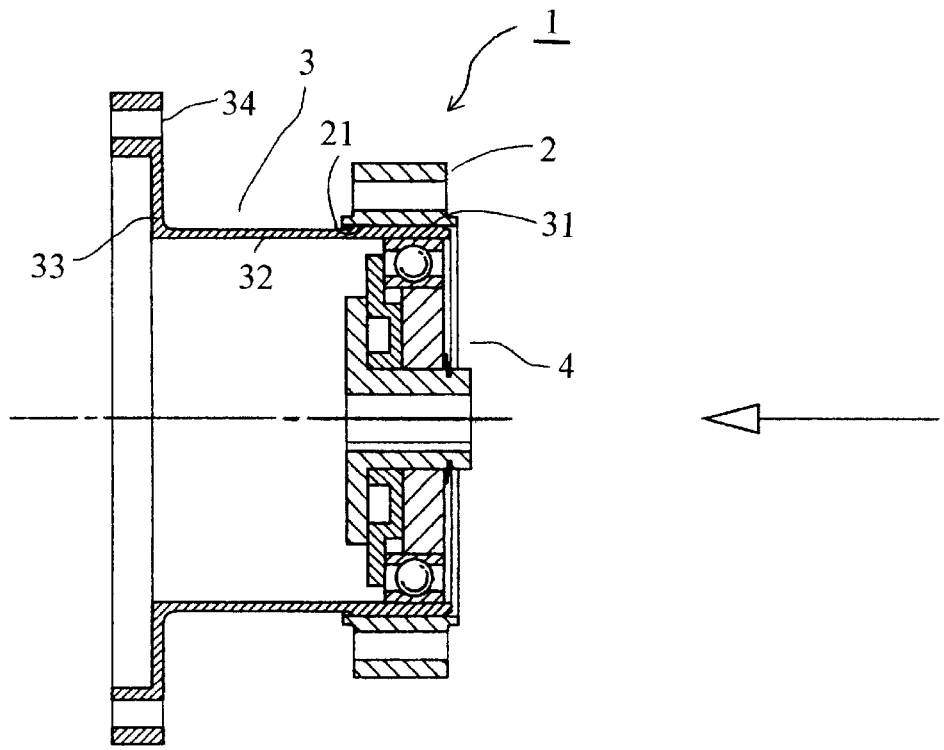
FIG. 1 is a longitudinal sectional view of a flexible meshing type gear device of the silk-hat type.

Referring now to the drawings, the present invention will be described in detail.

Figure 2:
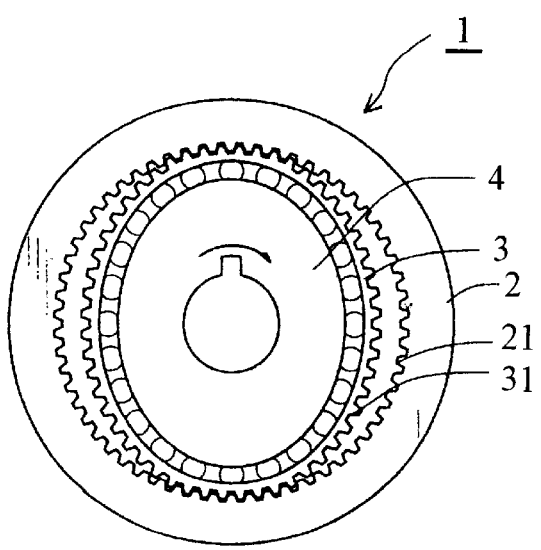
FIG. 2 is a schematic side view of the flexible meshing type gear device of FIG. 1.

As shown in FIGS. 1 and 2, a flexible meshing type gear device 1 of an example according to the present invention is a silk-hat type which comprises a circular rigid internal gear 2 having internal teeth 21 formed on the inner circumferential surface thereof, a flexible external gear 3 having external teeth 31 meshable with the inner teeth and formed on the outer circumferential surface thereof, and a wave generator 4 of elliptical profile.

The flexible external gear 3 is of a silk hat shape, which has an annular body 32, a circular diaphragm 33 extending outward and radially from one open end of the body 32, and a circular boss 34 formed integrally on the outer peripheral end of the diaphragm 33. The external teeth 31 are formed on the outer circumferential surface of the body 32 at its the other open end side.

The flexible external gear 3 is being deformed into an ellipsoid to mesh its external teeth located on major axis of the ellipsoid with the internal teeth. In a typical application wherein the internal gear 2 is fixed and the wave generator 4 is connected to a motor, a greatly reduced rotational output is derived from the external gear 3 in accordance with the difference in teeth between the internal and external gears. Reduction mechanism of this type of gear drive is well known, the explanation thereof is omitted here in this specification.

In operation, the respective external teeth of the flexible external gear 3 are repeatedly deformed in the radial direction during the rotation of the wave generator 4. Thus, the internal and external teeth 21, 31 are subject to intensive wearing conditions.

According to the flexible meshing type gear device 1 of this example, only the internal teeth 21 of the rigid internal gear 2 are formed thereon with a metal plated coating 21a. As the metal plating, electrolytic or electroless plating of Ni, Cr and the like can be adopted. Alternatively, PETF dispersed metal plating can also be adopted. The thickness of the coating 21a is preferably in the range from 2 to 20 micrometer. Further, the coating hardness of the metal plated coating 21a is preferably in the range from −100 Hv to +100 Hv as Vickers hardness with respect to the surface hardness of the external teeth 31 of the flexible external gear 3, and more preferably in the range −50 to +50 Hv.

The inventors of the present invention et al. conducted a variety of experiments for determining wear-resisting properties of the internal and external teeth of the gears 2 and 3, according to which it has found that, only when the rigid internal gear 2 is metal plated, wear resistance of both internal and external teeth 21, 31 is greatly improved while maintaining fatigue strength of both gears 2, 3. Especially, it has been found that the tooth portion of the external gear 3 is maintained in a preferable condition in terms of its fatigue strength.

In table 1, results of an example of tests conducted by the inventors et al. are listed, wherein a flexible meshing type gear device to be tested is one identified by Product No. CSF-40-100-2A-GR manufactured by the same assignee of the present invention. As is apparent from table 1, wear resistance of the flexible meshing type gear device according to the present invention is extremely improved.

TABLE 1

Fluctuating Load Durability Test
(Tested Product: CSF-40-100-2A-GR/Lubricant: Grease)

| Tested Combination | | Wear resistance |
| --- | --- | --- |
| Rigid internal gear | Flexible external gear | (compared to standard combination) |
| Standard sample (Hv 300) | Standard sample (Hv 450) | 1.0 (Standard combination) |
| Ni-P plated sample (Hv 440) | Standard sample (Hv 450) | 4.0 |
| Ni-P-PTFE plated sample (Hv 465) | Standard sample (Hv 450) | 5.0 |

Figure 3:
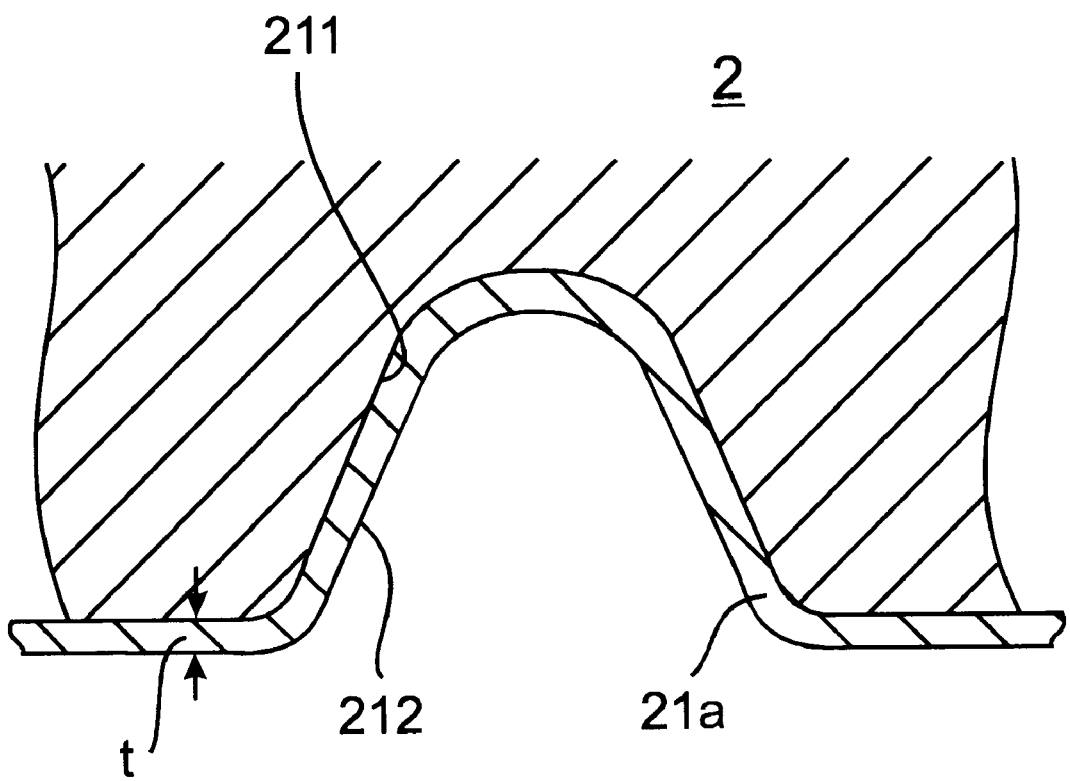
FIG. 3 illustrates a portion of the internal teeth of the internal gear in an enlarged state.

While, according to this example, as shown in FIG. 3, the tooth profile 211 of the internal teeth 21 before metal plating is modified in consideration of the thickness t of the metal plated coating 21a such that a tooth profile 212 defined by the surface of the coating 21a on the internal teeth 21 after metal plating corresponds to a desired tooth profile for establishing a proper meshing between the internal and external teeth 21 and 31.

For example, FIG. 3 illustrates a case in which the metal plated coating 21a has substantially the same thickness at its respective portions. In this case, the internal teeth 21 is manufactured to have the tooth profile 211 as defined by a similar curve to that defining the desired tooth profile 212.

According to the present example, the tooth profile 212 of the internal teeth 21 after metal plating corresponds to the desired tooth profile for ensuring a proper meshing of the teeth between the internal and external gears. Therefore, a proper meshing between both gears can be maintained after the internal gear is subject to metal plating. In contrast, no attention has been paid to a proper meshing of gears after the gears are surface treated to enhance wear resistance in a conventional flexible meshing type gear device, and so it cannot be assured proper meshing of gears after surface treatment thereof, especially after the gears are formed thereon with wear resisting coating thicker than 2 micrometer.

As mentioned above, according to the present invention, a flexible meshing type gear device having a high wear resistance can be realized while maintaining a high fatigue strength of the flexible external gear and a proper meshing of gears.

Although the present invention is described with reference to a silk-hat type flexible meshing type gear drive, it can also be applied to the other type of flexible meshing type gear drives having a different shaped flexible external gear. For example, the present invention can be applied to a cup-type flexible external gear device which has a cup-shaped flexible external gear.

We claim:

1. A flexible meshing type gear device which comprises a circular rigid internal gear having internal teeth on an inner circumferential surface thereof, a flexible external gear having external teeth on an outer circumferential surface thereof, the external teeth being meshable with the internal teeth, and a wave generator for deforming the flexible external gear radially to partially mesh the external teeth thereof with the internal teeth of the rigid internal gear and for moving meshing portions of the teeth circumferentially, only the internal teeth of the rigid internal gear are formed thereon with a metal plated coating.

2. A flexible meshing type gear device according to claim 1, wherein the metal plated coating is of an electrolytic or electroless plating of Ni or Cr.

3. A flexible meshing type gear device according to claim 2, wherein the metal plated coating is of a PTFE dispersed metal plating.

4. A flexible meshing type gear device according to claim 1, wherein a thickness of the metal plated coating is in the range from 2 to 20 micrometer.

5. A flexible meshing type gear device according to claim 1, wherein a coating hardness of the metal plated coating is in the range from −100 to +100 Hv as Vickers hardness with respect to a surface hardness of the external teeth of the flexible external gear.

6. A flexible meshing type gear device according to claim 5, wherein the coating hardness of the metal plated coating is in the range between −50 and +50 Hv.

7. A flexible meshing type gear device according to claim 1, wherein before metal plating a tooth profile of the internal teeth of the rigid internal gear having a desired tooth profile of the internal teeth is modified such that the tooth profile of the internal teeth after metal plating corresponds substantially to the desired tooth profile of the internal teeth for assuring a proper meshing between the internal and external gears.

8. A flexible meshing type gear device according to claim 7, wherein the metal plated coating is of an electrolytic or electroless plating of Ni or Cr.

9. A flexible meshing type gear device according to claim 8, wherein the metal plated coating is of a PTFE dispersed metal plating.

10. A flexible meshing type gear device according to claim 7, wherein a thickness, of the metal plated coating is in the range from 2 to 20 micrometer.

11. A flexible meshing type gear device according to claim 7, wherein a coating hardness of the metal plated coating is in the range from −100 to +100 Hv as Vickers hardness with respect to a surface hardness of the external teeth of the flexible external gear.

12. A flexible meshing type gear device according to claim 11, wherein the coating hardness of the metal plated coating is in the range between −50 and +50 Hv.

* * * * *